US006628511B2

(12) United States Patent
Engstrom (10) Patent No.: US 6,628,511 B2
(45) Date of Patent: Sep. 30, 2003

(54) PALM-SIZED HANDHELD DEVICE WITH INVERTED ERGONOMIC KEYPAD

(75) Inventor: Eric Engstrom, Kirkland, WA (US)

(73) Assignee: Xoucin, Inc., Kirkland, WA (US)

( * ) Notice: Subject to any disclaimer, the term of this patent is extended or adjusted under 35 U.S.C. 154(b) by 0 days.

(21) Appl. No.: 09/767,361

(22) Filed: Jan. 22, 2001

(65) Prior Publication Data

US 2002/0097553 A1 Jul. 25, 2002

(51) Int. Cl.[7] .................................................. G06F 1/16
(52) U.S. Cl. .......................... 361/683; 361/727; 400/88; 345/173
(58) Field of Search ................................. 361/680, 681, 361/683, 684–687, 724–727; 400/88, 613, 472; 345/173

(56) References Cited

U.S. PATENT DOCUMENTS

| 5,287,246 A | * | 2/1994 | Sen | 361/683 |
| 5,995,084 A | * | 11/1999 | Chan et al. | 345/173 |
| 6,278,442 B1 | | 8/2001 | Griffin et al. | 345/169 |
| 6,327,482 B1 | * | 12/2001 | Miyashita | 455/566 |
| 6,330,149 B1 | * | 12/2001 | Burrell | 361/683 |
| 6,373,501 B1 | | 4/2002 | Fiero | 345/700 |

\* cited by examiner

Primary Examiner—Darren Schuberg
Assistant Examiner—Hung Van Duong
(74) Attorney, Agent, or Firm—Schwabe, Williamson & Wyatt, P.C.

(57) ABSTRACT

A palm-sized handheld device includes a body casing having a top end and a bottom end. In accordance with one embodiment of the invention, the device also includes a display screen proximately disposed near the bottom end of the device, and a plurality of input keys proximately disposed near said top end of the device above the input display screen.

As a result of such a configuration, accessibility to the input keys by users+ thumbs is improved while glare from a bright light source on the display screen may be decreased.

11 Claims, 6 Drawing Sheets

PALM-SIZED HANDHELD DEVICE WITH INVERTED ERGONOMIC KEYPAD

BACKGROUND OF THE INVENTION

1. Field of the Invention

The present invention relates to the field of handheld digital devices. More specifically, the present invention relates to the placement of data entry keys with respect to the display within each of these devices.

2. Background Information

Advances in computer and telecommunication technology have led to the wide spread adoption and miniaturization of electronic organization and communication devices, such as personal digital assistants (PDAs) and wireless pagers. Although smaller versions of such devices allow increased portability, the reduction in size is typically accompanied by awkward keypad positioning thereby hindering one's ease of use and possibly causing discomfort to the user.

Figure 1:
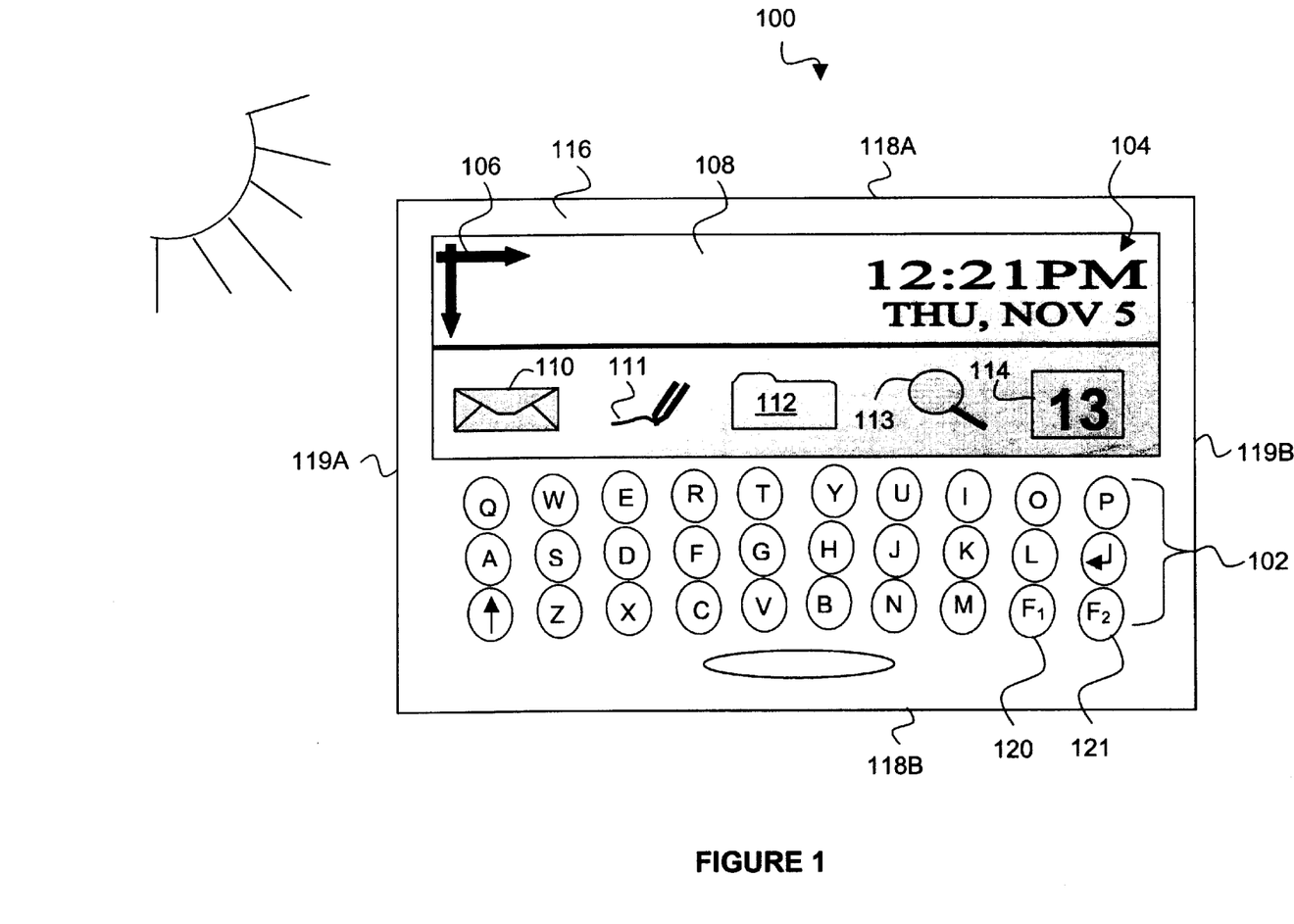
FIG. 1 illustrates a typical prior art PDA.

FIG. 1 illustrates an exemplary prior art PDA. As illustrated, prior art PDA 100 typically includes body-casing 116 with top end 118A, bottom end 118B, left side 119A and right side 119B, as well as keypad 102, disposed near bottom end 118B. Keypad 102 represents a set of small, fingertip-sized data entry keys configured in a standard "QWERTY" arrangement to facilitate a user in providing numeric and/or alphanumeric input into PDA 100. Keypad 102 further includes function keys 120–121, which are linked to pre-programmed functions such as character mode and/or operating mode switching activated by the press of the appropriate function keys 120–121 by a user.

PDA 100 further includes display screen 108, which is disposed near top end 118A above keypad 102, and is used to echo numeric or alphanumeric inputs entered by a user, as well as to display various graphical and/or alphanumeric messages, menu options, control information, status information, and so forth. For example, display screen 108 is illustrated as displaying graphical icons 110–114, and date and time information 104.

Although the physical size of body casing 116 may vary, PDA 100 is typically palm-sized so as to fit within the palm of an average user's hand. During normal use, by virtue of its configuration with keypad 102 disposed near bottom end 118B and display screen 108 disposed near top end 118A above keypad 102, a user will typically rest body casing 116 on one or both of their index fingers formed into an arch with at least one of the user's thumbs being utilized to pinch PDA 100 against the arched forefinger(s), thus leaving only one of the users thumb free to enter and/or manipulate data via keypad 102. Accordingly, the user typically severely arches their thumbs into an inconvenient and uncomfortable position in order to operate PDA 100, thereby exposing the user to possible discomfort. Furthermore, due to keypad 102 being disposed below display screen 108, display screen 108 is rendered vulnerable to bright light sources such as the sun. In situations where display screen 108 represents a backlit display for example, such bright light shone on display screen 108 can severely interfere with the users viewing of information displayed within display screen 108.

Therefore, a more user-friendly design, in particular, one that improves thumb manipulability of the keypad is desired.

SUMMARY OF THE INVENTION

A palm-sized handheld device includes a body casing having a top end and a bottom end. In accordance with one embodiment of the invention, the device also includes a display screen proximately disposed near the bottom end of the device, and a plurality of input keys proximately disposed near said top end of the device above the input display screen.

As a result of such a configuration, accessibility to the input keys by users' thumbs is improved while glare from a bright light source on the display screen may be decreased.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention. The phrase "in one embodiment" will be used repeatedly, however the phrase does not necessarily refer to the same embodiment, although it may.

Figure 2:
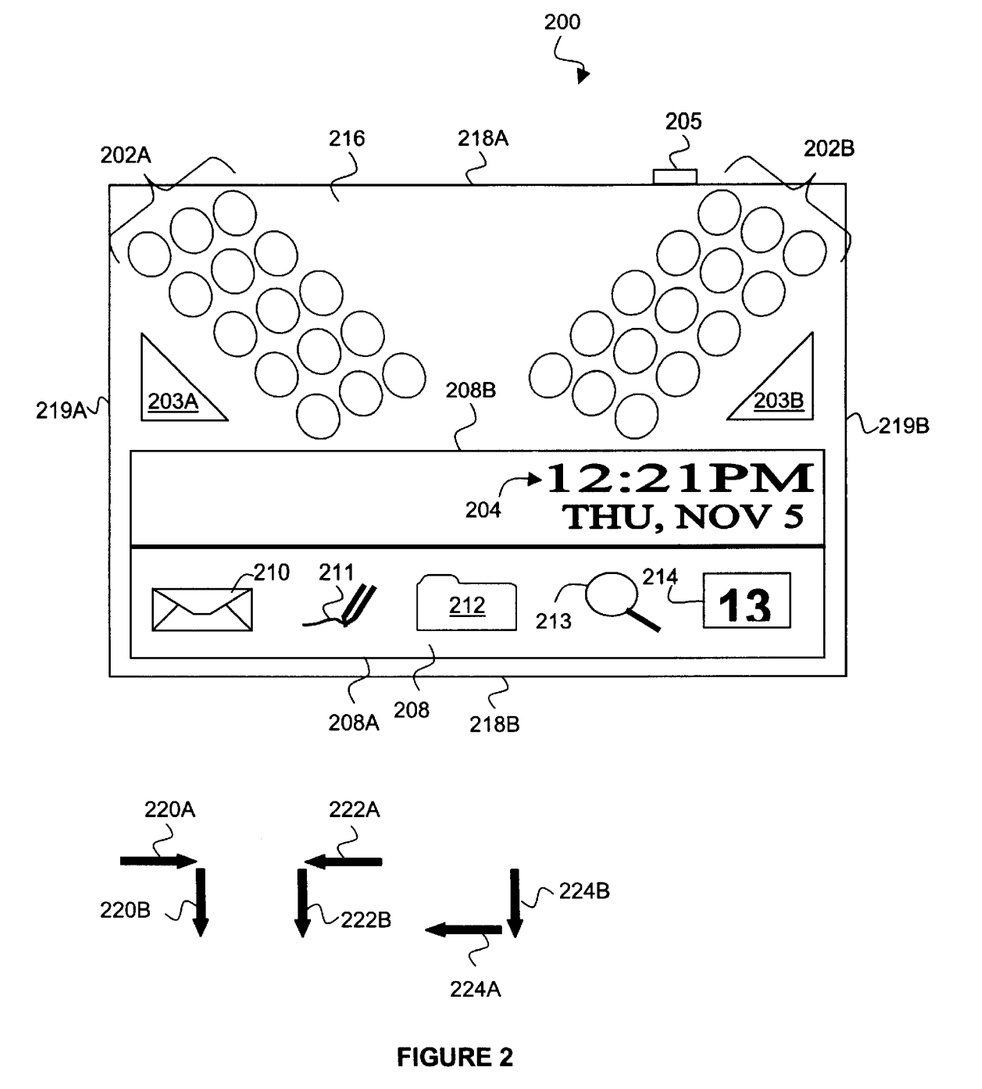
FIG. 2 illustrates a PDA of the present invention incorporated with a keypad disposed above the display, in accordance with one embodiment.

Referring now to FIG. 2, wherein a front view of a personal digital assistant (PDA) 200, incorporated with the teachings of the present invention in accordance with one embodiment, is shown. PDA 200 includes body casing 216 having a top end 218A, a bottom end 218B, a left side 219A, a right side 219B, display screen 208, left key set 202A and right key set 202B. Except for the teachings of the present invention, each of these elements is used to provide the same functionality as the functionality provided by the corresponding element of prior art PDA 100 described earlier, that is for the input of numeric and/or alphanumeric data, for displaying various graphical and/or alphanumeric messages, and so forth. However, unlike prior art PDA 100 of FIG. 1, the keypad of PDA 200 has been advantageously and ergonomically disposed near top end 218A above display screen 208 as well as divided into left key set 202A and right key set 202B. Such an arrangement provides convenient access to the data input keys with out causing thumb strain caused by prior art PDA configurations, and without causing users' thumbs to interfere with viewing of the text and/or images displayed on display screen 208. In one embodiment of the invention, display screen 208 is rectangular in shape having a top edge 208B, a bottom edge 208A disposed below top edge 208B, a left side and a right side. In one embodiment, at least one of left key set 202A and right key set 202B is disposed at an angle with respect to at least one of bottom edge 208A and/or top edge 202A of display screen 208. In one embodiment, at least one of left key set 202A and right key set 202B is disposed at approximately a forty-five degree angle with respect to at least one of bottom edge 208A and/or top edge 202A of display screen 208.

Note that top end 218A and bottom end 218B (as well as top edge 208B and bottom edge 208A of display screen 208) are objectively determined. A device such as PDA 200 having display screen 208 necessarily has a display orientation. For example, textual data are either rendered from left to right and top to bottom, as denoted by arrows 220A and 220B respectively, as in the case of the English language, or right to left and top to bottom, as denoted by arrows 222A and 222B respectively, as in the case of the Hebrew language, or top to bottom and right to left, as denoted by arrows 224A and 224B respectively, as in the case of the Chinese language. Thus the manner in which textual data are rendered defines which end is the top end, and which end is the bottom end of PDA 200. Accordingly, an element X of PDA 200, is necessarily above element Y of PDA 200 and element Y is necessarily below element X, if element X is closer to the objectively determinable top end of PDA 200 or if element Y is closer to the objectively determinable bottom end of PDA 200.

As illustrated, display screen 208 represents a broad category of display screens, such as a liquid crystal display (LCD), to display text and/or graphical information such as status information and input and output data the user may be interested in viewing. For example, display screen 208 includes date and time display 204 designed to inform a user of the current date and time, as well as graphical icons 210–214 designed to provide a user with expedited access to a variety of operating functions that PDA 200 may be equipped to perform.

Depending upon the particular implementation, PDA 200 may be equipped to provide services including but not limited to electronic mail services, text editing services, file storage services, and calendaring services. For example, mail icon 210 may represent an electronic mail function, which when selected, provides a user with the ability to transmit and/or receive electronic messages. Similarly, edit icon 211 may represent a text editing function, which when selected, provides a user with the ability to create and/or edit simple text messages. Likewise, calendar icon 214 may represent various calendaring functions available to a user. These and other functions described in the context of PDA 200 are intended to be merely illustrative and should not be read as limiting the present invention. Accordingly, PDA 200 may represent a wide variety of devices that provide a similarly wide variety of functionalities. For example, PDA 200 may be implemented as a multi-function personal digital assistant, or as a dedicated personal paging device, provided that one or more data input keys and/or devices are disposed above display screen 208. In one embodiment, PDA 200 is approximately 3.5 inches in length measured from left side 219A to right side 219B, and 2.5 inches in width measured from top end 218A to bottom end 218B.

Body casing 216 further includes finger mouse 205 as well as left mouse button 203A and right mouse button 203B. In one embodiment finger mouse 205 is ergonomically disposed near top end 218A so as to correspond to the natural arch of a user's index finger when naturally grasping a device such as PDA 200. In FIG. 2, finger mouse 205 is illustrated as being disposed above right key set 202B, however finger mouse 205 or an additional finger mouse may be disposed above left key set 202A. Furthermore, other user input devices such as a track wheel and/or roller ball may be utilized in addition to, or in place of finger mouse 205. However, such a user input device is not required. In the illustrated embodiment, left mouse button 203A is disposed above display screen 208 and at least partially below left key set 202A so as to provide convenient access by one's left thumb, whereas right mouse button 203B is disposed above display screen 208 and at least partially below right key set 202B so as to provide convenient access by one's right thumb. In one embodiment, left mouse button 203A is disposed above display screen 208 and at least partially between left side 219A and left key set 202A, whereas right mouse button 203B is disposed above display screen 208 and at least partially between right side 219B and right key set 202B.

Figure 3:
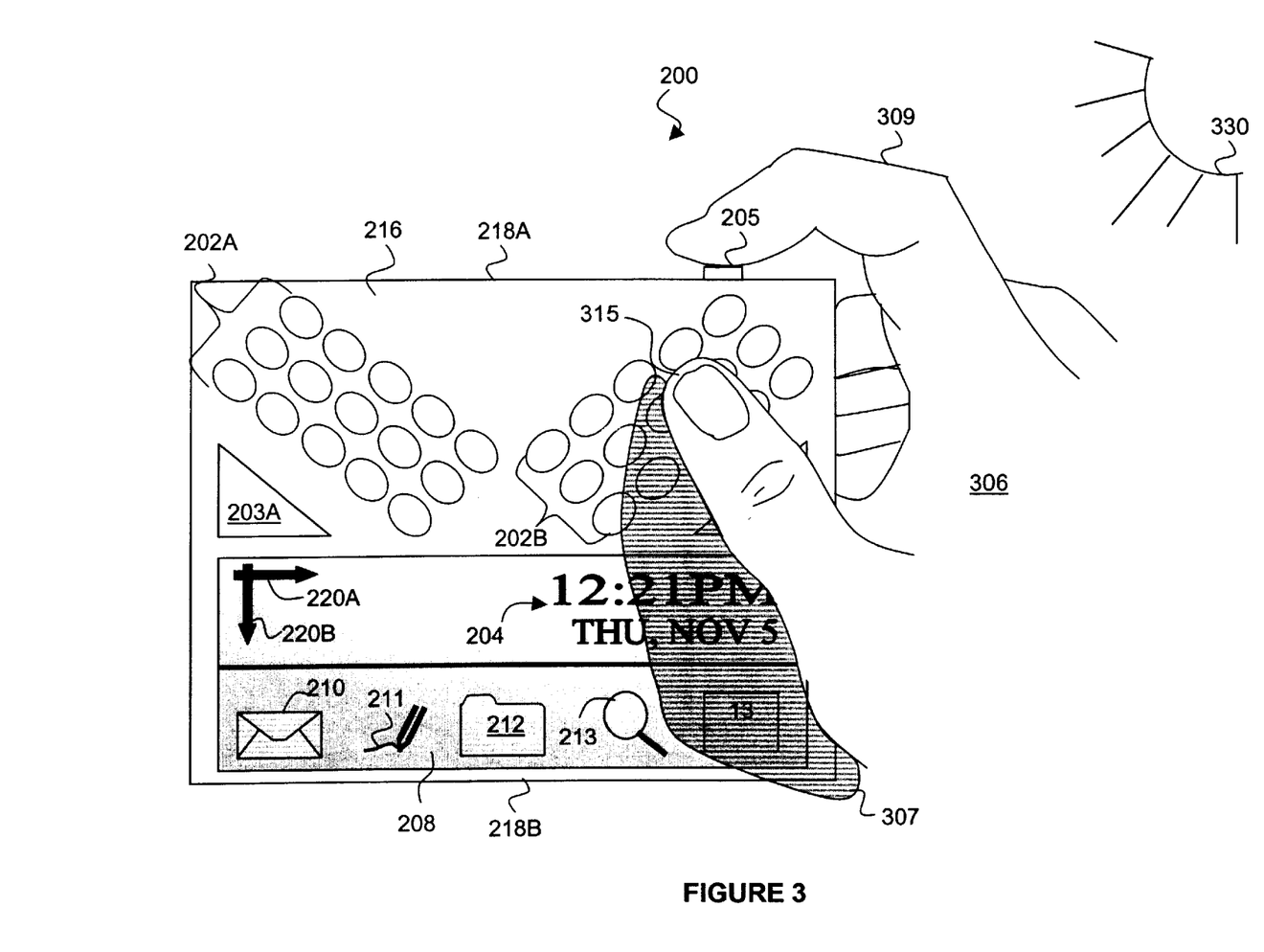
FIG. 3 further illustrates PDA 200 of FIG. 2, incorporated with the teachings of the present invention, in accordance with one embodiment.

Referring now to FIG. 3, wherein PDA 200 is further illustrated as incorporating the teachings of the present invention, in accordance with one embodiment. As described above with respect to FIG. 2, PDA 200 of FIG. 3 includes display screen 208 disposed near bottom end 218B, below left mouse button 203A and left key set 202A, as well as right mouse button 203B and right key set 202B, which are both partially hidden by right hand 306. Right hand 306 represents a user's right hand grasping PDA 200 in a natural grasping position such that index finger 309 may be utilized to manipulate finger mouse 205, and thumb 315 may be utilized to manipulate right key set 202B, while at the same time limiting the strain normally placed on right thumb 315 and/or right hand 306 by keypad configurations of the prior art. At the same time, the novel and advantageous configuration of PDA 200 likewise facilitates natural and reduced strain grasping of PDA 200 by a user's left hand (not shown). Accordingly, finger mouse 205 may be disposed near top edge 218A in a location more conducive for use with a finger from a user's left hand. However, it should be noted that the advantageous configuration of the present invention facilitates single-hand usage of PDA 200, thereby freeing a user's second hand for other tasks.

In addition to facilitating ergonomic use of PDA 200, the novel arrangement of display screen 208 below left key set 202A and right key set 202B further provides a user with the ability to shield display screen 208 from glare caused by light source 330 without hindering use of PDA 200. For example, when PDA 200 is grasped in a natural and comfortable manner such as is illustrated in FIG. 3, right hand 306 (as well as a user's left hand) necessarily tends to shield PDA 200 from light source 330 as illustrated by shadow 307. Body casing configurations of the prior art, however, include display screens that are disposed above the keypad, leaving the display screen vulnerable to distracting glare. It should be noted that the novel configuration of body casing 216 is such that even as thumb 307 and index finger 309 are used to enter data via right key set 202B and finger mouse 205 respectively, right hand 306 (as well as a left hand) is nonetheless continually positioned so as to block unwanted and distracting light from light source 330.

Figure 4:
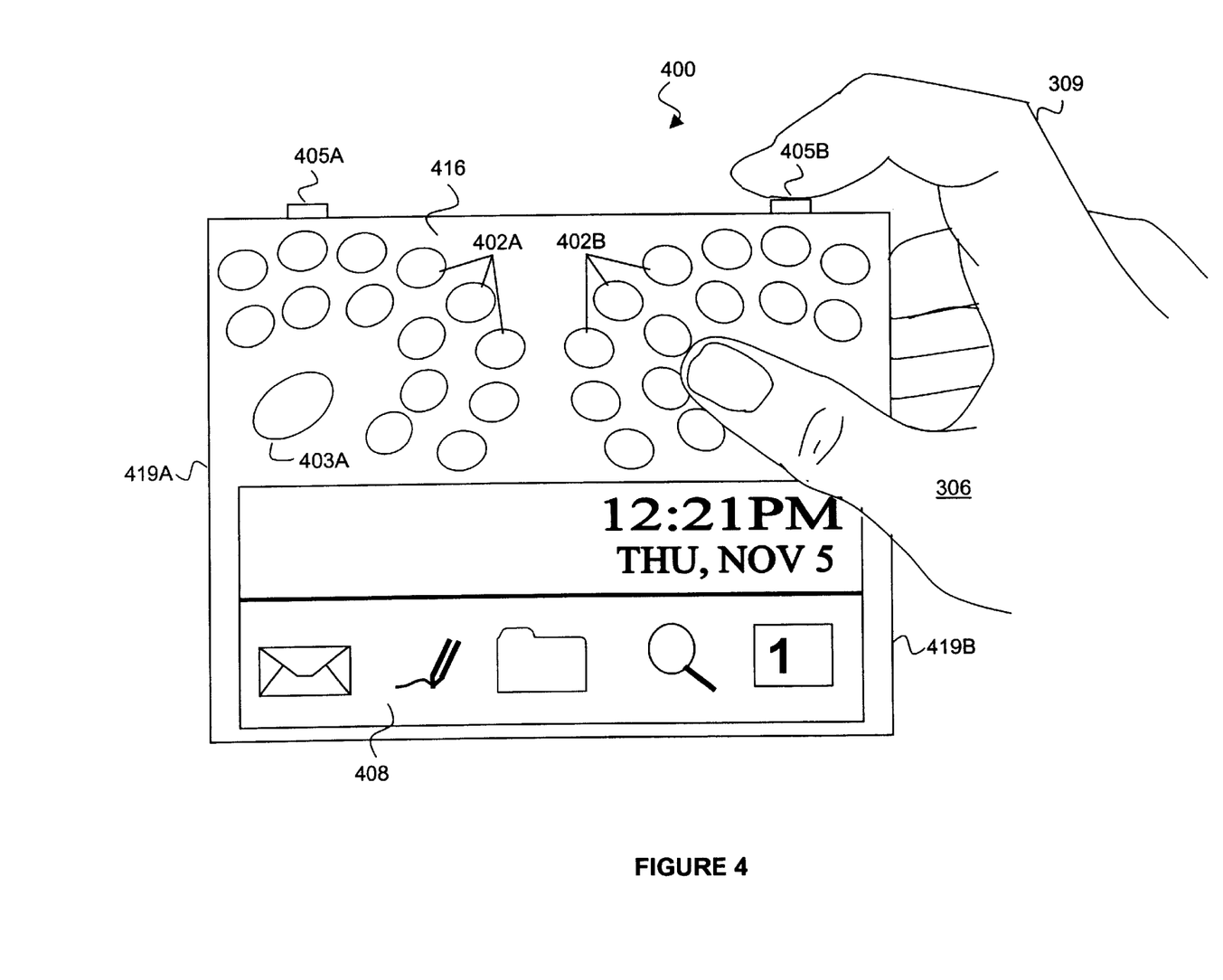
FIG. 4 illustrates a PDA incorporating various advantageous aspects of the present invention, in accordance with a second embodiment.
Figure 5A:
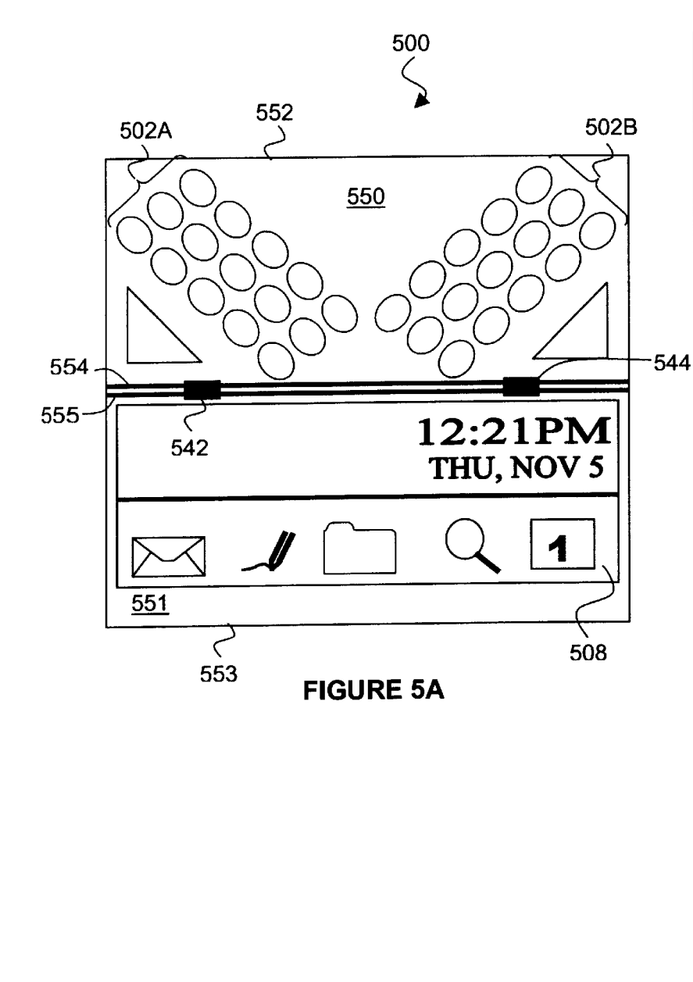
FIGS. 5A–5E illustrate a PDA incorporating various advantageous aspects of the present invention, in accordance with a third embodiment.
Figure 5B:
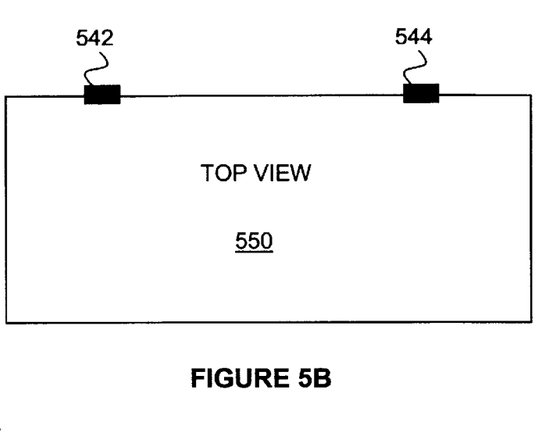
Figure 5C:
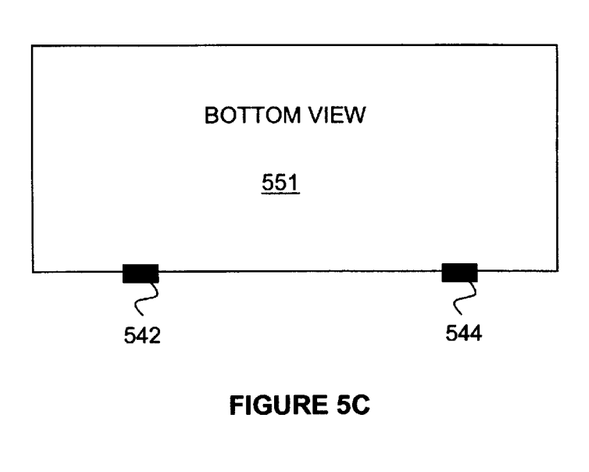
Figure 5D:
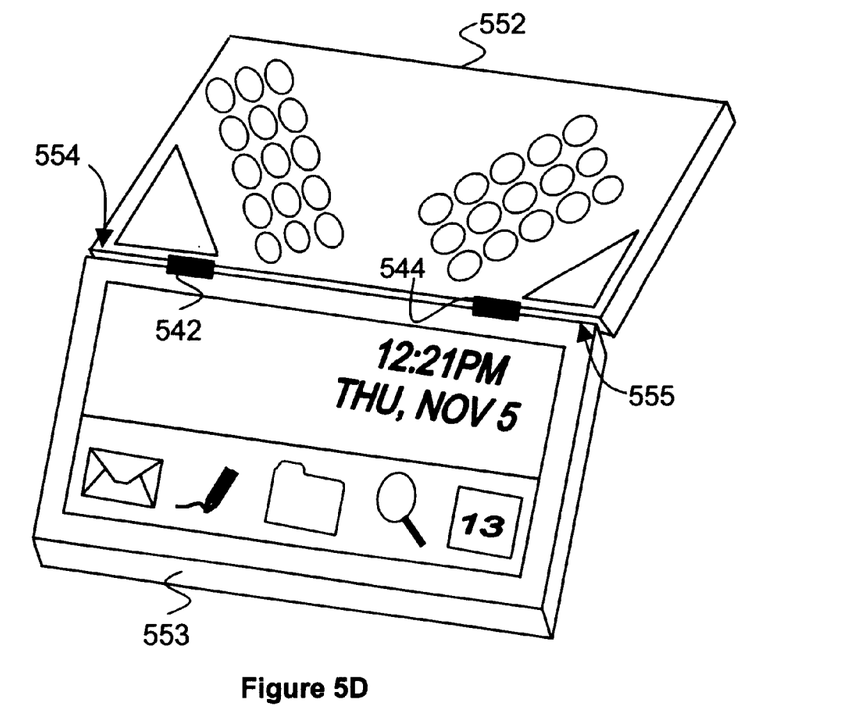
Figure 5E:
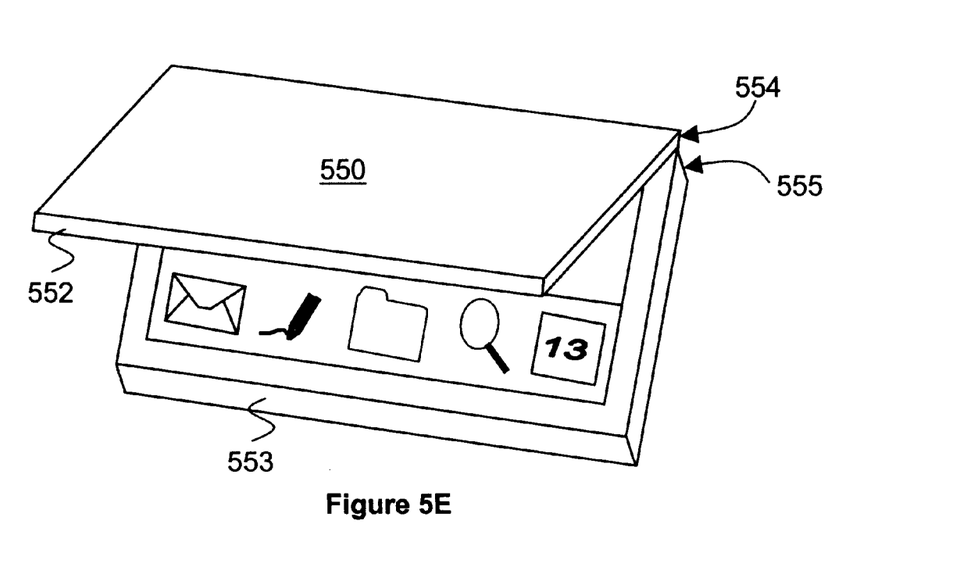

FIG. 4 illustrates a PDA incorporating advantageous aspects of the present invention, in accordance with a second embodiment. PDA 400 is shown being grasped by right hand 306. PDA 400 is similarly configured to PDA 200, however, PDA 400 includes left finger mouse 405A in addition to right finger mouse 405B. Both left finger mouse 405A and right finger mouse 405B may be activated concurrently, or either may be selectively activated based upon user preference. Additionally, PDA 400 includes body casing 416 having left key set 402A disposed near left side 419A and right key set 402B disposed near right side 419B. Each of left key set 402A and right key set 402B are arranged in two or more concentric circles and/or arches. Depending upon implementation, left key set 402A may include all alphabetical characters, whereas right key set 402B may include all numeric and/or special characters. Similarly, both left key set 402A and right key set 402B may include alphanumeric characters that are organized in a variety of positional relationships. Furthermore, left mouse button 403A is formed in the shape of an oval rather than a triangle as illustrated in FIG. 2 and FIG. 3. It should be noted that data input keys and mouse buttons of a variety of shapes and sizes may similarly be utilized.

FIGS. 5A–E illustrate a PDA incorporating advantageous aspects of the present invention, in accordance with a third embodiment. PDA 500 includes upper body portion 550 having an outer end 552 and an inner end 554. Upper body portion 550 further includes left key set 502A and right key set 502B. PDA 500 also includes lower body portion 551 having inner end 555 and outer end 553, as well as display 508. In one embodiment, upper body portion 550 and lower body portion 551 are pivotally coupled together by hinges 542 and 544. It should be noted that a single hinge or multiple hinges might also be used. Similarly, connection mechanisms other than hinges may be used to allow movement of outer end 552 towards and away from outer end 553 while inner ends 554 and 555 remain in a substantially fixed location relative to each other. Such a hinged configuration not only provides advantageous positioning of display screen 508 below the left and right key sets, but also enables a user to close PDA 500 thereby shielding display screen 508 from exposure to damage and dust for example.

Thus, a palm-sized hendheld device having an ergonomic inverted keyboard has been disclosed. In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A personal digital assistant comprising:
   a body casing having a top end and a bottom end;
   a display screen having a top edge, a bottom edge, a left side, a right side, and proximately disposed near said bottom end of the body casing;
   a first plurality of input keys of a QWERTY keypad proximately disposed above said top edge of said input display screen, near said top end of the body casing and said left side of said input display screen, in an ergonomically rotated manner forming an angle that measures approximately 45 degrees with respect to said top edge of said display screen; and
   a second plurality of input keys of the QWERTY keypad proximately disposed above said top edge of said input display screen, near said top end of the body casing and said right side of said input display screen, in an ergonomically rotated manner, forming an angle that measures approximately 45 degrees with respect to said top edge of said display screen.

2. A personal digital assistant comprising:
   a body casing having a top end and a bottom end;
   a display screen having a top edge, a bottom edge, a left side, a right side, and proximately disposed near said bottom end of said body casing;
   a first plurality of input keys of a QWERTY keypad proximately disposed above said top edge of said display screen, near said top end of said body casing and said left side of said input display screen, in a first ergonomic concentric arrangement; and
   a second plurality of input keys of said QWERTY keypad proximately disposed above said top edge of said display screen, near said top end of said body casing and said right side of said input display screen, in a second ergonomic concentric arrangement.

3. A personal digital assistant comprising:
   a body casing having a top end and a bottom end;
   a display screen proximately disposed near said bottom end;
   a plurality of input keys of a QWERTY paypad proximately disposed near said top end above said input display screen, wherein said body casing further comprises a left side to the left of said display screen between said top end and said bottom end, and a right side opposite said left side and to the right of said display screen between said top end and said bottom end, and said plurality of input keys comprises a first set of keys and a second set of keys, wherein said first set of keys are further situated near said left side of said body casing to facilitate ergonomic access by a left thumb and said second set of keys are situated near said right side of said body casing to facilitate ergonomic access by a right thumb.

4. The personal digital assistant of claim 3, wherein said top and bottom ends each having dimensions of approximately 3.5 inches and said left and right sides each having dimensions of approximately 2.5 inches.

5. The personal digital assistant of claim 3, further comprising a finger mouse.

6. The personal digital assistant of claim 3, wherein said personal digital assistant further comprises a mouse button proximately disposed on said body casing, above said display screen, and situated at least partially between at least a subset of said first set of input keys and said left side or at least partially between at least a subset of said second set of input keys and said right side.

7. The personal digital assistant of claim 5, wherein said finger mouse comprises at least one of a trackball and a track-wheel.

8. A personal digital assistant comprising:

an upper body portion having an outer top end, an inner bottom end and a plurality of input keys disposed between said outer top end and said inner bottom end; and a lower body portion having an inner top end, an outer bottom end, and a display screen disposed between said inner top end and said outer bottom end, wherein said lower body portion is attached at said inner top end to said upper body portion at said inner bottom end.

9. The personal digital assistant of claim 8, wherein said lower body portion is hingedly coupled to said upper body portion to facilitate movement of said outer top end towards and away from said outer bottom end.

10. The personal digital assistant of claim 9, wherein when the outer top end is moved away from the outer bottom end such that the upper body portion and the lower body portion lie substantially within the same plane, the dimensions of the combined upper and lower body portions approximate that of a handheld device.

11. A wireless pager comprising:

a body casing having a top end and a bottom end;

at least one input key proximately disposed near said top end; and a display screen proximately disposed near said bottom end below said at least one input key, wherein said body casing further comprises a left side to the left of said display screen between said top end and said bottom end, and a right side opposite said left side and to the right of said display screen between said top end and said bottom end, and said at least one input key further comprises a first set of keys and a second set of keys, wherein said first set of keys are further situated near said left side of said body casing to facilitate ergonomic access by a left thumb and said second set of keys are situated near said right side of said body casing to facilitate ergonomic access by a right thumb.

* * * * *